Figure 1:
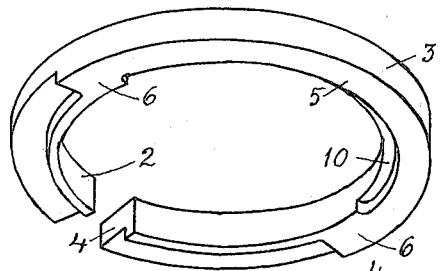

July 14, 1936.    T. MADSEN    2,047,590
PISTON RING
Filed July 2, 1934    4 Sheets-Sheet 1

Inventor:
Tage Madsen
By E. F. Wenderoth
Atty

July 14, 1936.  T. MADSEN  2,047,590
PISTON RING
Filed July 2, 1934  4 Sheets-Sheet 2
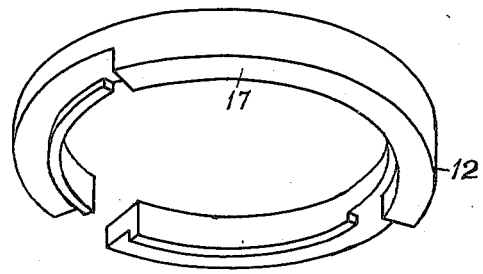
Fig. 7.
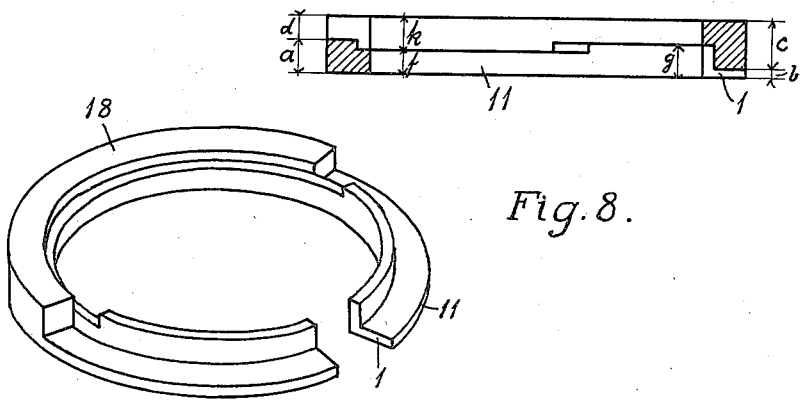
Fig. 9.
Fig. 8.
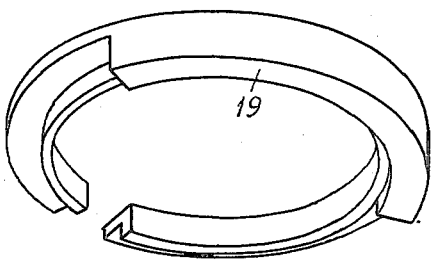
Fig. 10.
Fig. 12.
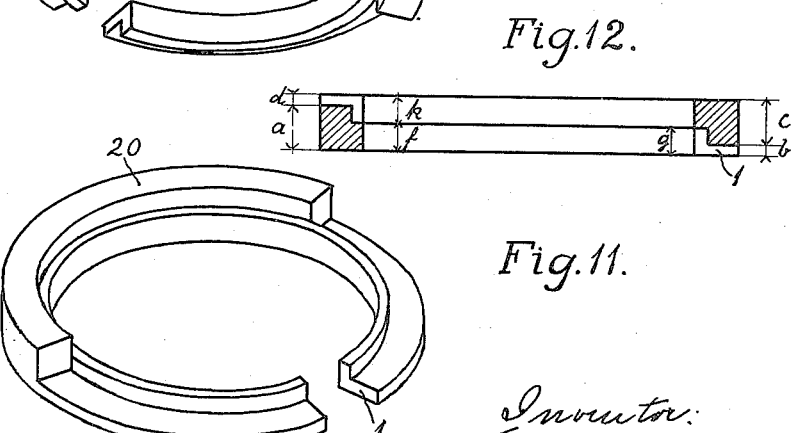
Fig. 11.
Inventor:
Tage Madsen
By E. F. Wendroth
Atty July 14, 1936.   T. MADSEN   2,047,590
PISTON RING
Filed July 2, 1934    4 Sheets-Sheet 3
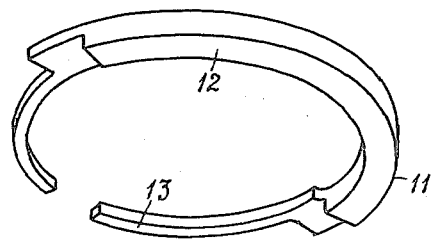
Fig.13.
Fig.15.
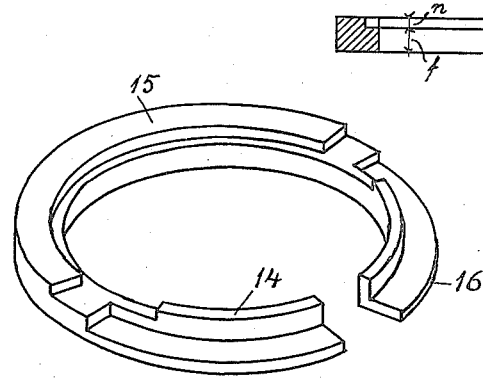
Fig.14.
Fig.16.
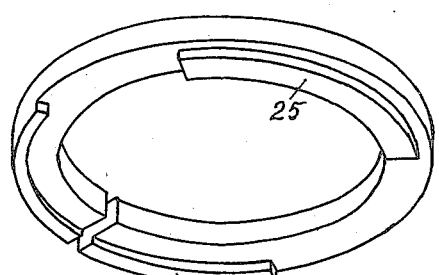
Fig.18.
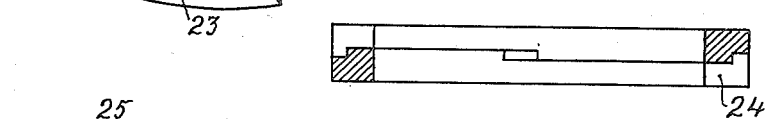
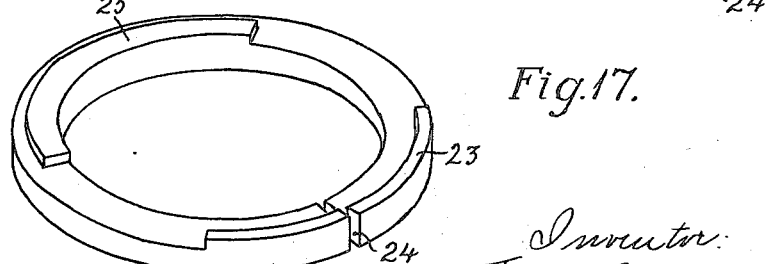
Fig.17.
Inventor:
Tage Madsen
By C. F. Wendroth
Atty July 14, 1936.  T. MADSEN  2,047,590
PISTON RING
Filed July 2, 1934  4 Sheets-Sheet 4
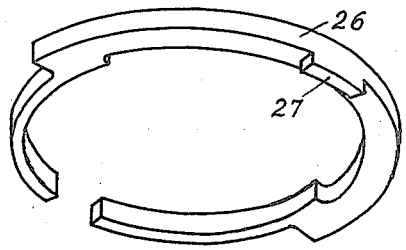
Fig. 19.
Fig. 21.
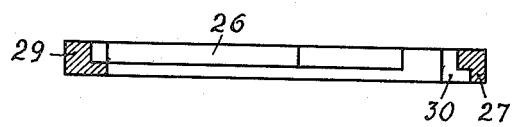
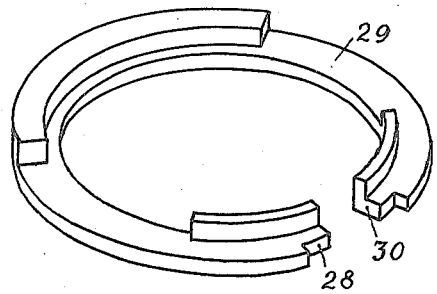
Fig. 20.
Fig. 22.  Fig. 24.
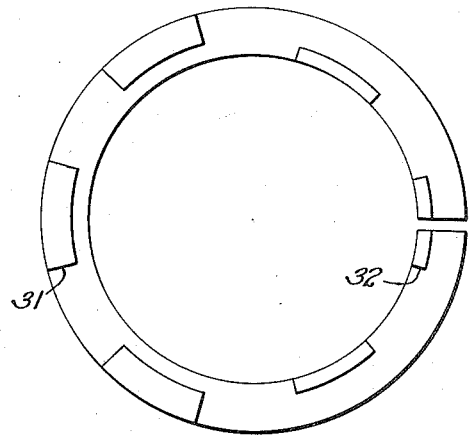  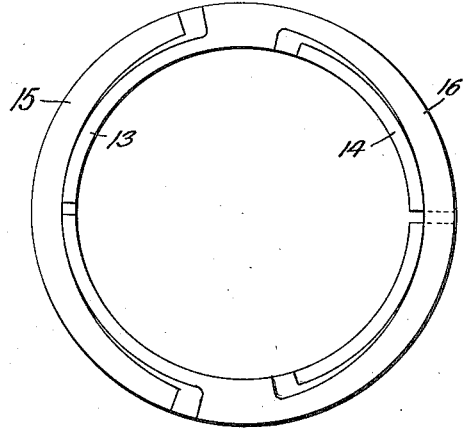
Fig. 23.
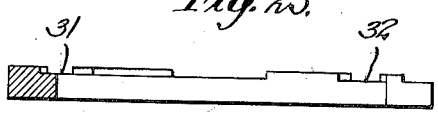
Inventor:
Tage Madsen
By E. F. Wendroth
Atty Patented July 14, 1936

2,047,590

UNITED STATES PATENT OFFICE 2,047,590

PISTON RING

Tage Madsen, Goteborg, Sweden

Application July 2, 1934, Serial No. 733,503
In Sweden October 13, 1933

3 Claims. (Cl. 309—29)

This invention relates to improvements in packing rings for the pistons in steam and combustion engines and is directed more particularly to piston rings which comprise a combination of a pair of split rings which are provided with interengaging projections and recesses.

It is an object of the invention to provide axially extending flanges upon the piston rings in order to prevent the ends of each component ring from projecting beyond the outer surface of the ring coacting therewith and also simultaneously prevent oil and grease from accumulating between the rings and causing an undue working of the rings.

With the above and other objects in view which will become apparent from the following detailed description, the invention comprises the arrangement and combination of elements set forth below, claimed in the claims, and shown in the drawings, in which—

Figure 3:
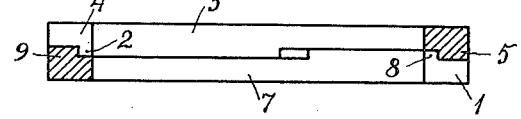
Figure 2:
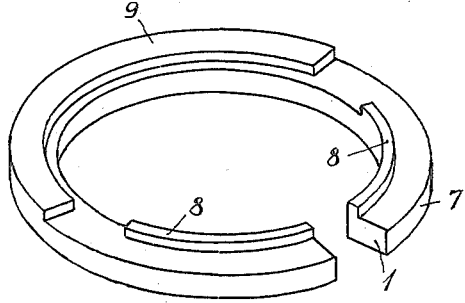
Figure 4:
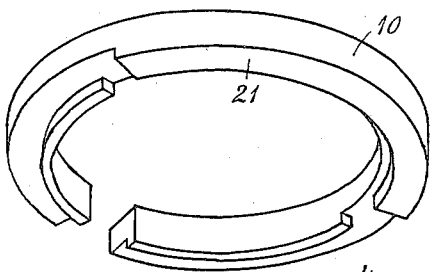
Figure 6:
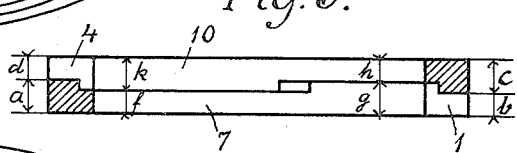
Figure 5:
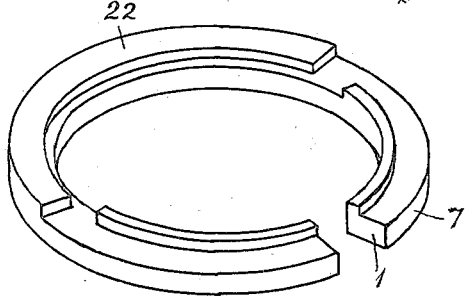

Figure 1 shows a perspective view of an upper component ring, showing particularly the under side thereof, Figure 2 shows a perspective view of the lower component ring illustrating particularly the upper side thereof, Figure 3 is a cross sectional view through both rings when combined taken between the splits thereof, Figure 4 is a perspective view of a modification showing the upper ring and particularly the lower surface thereof, Figure 5 is a perspective view of the component ring which is to cooperate with that shown in Figure 4 and showing particularly the upper side thereof, Figure 6 is a cross sectional view through the splits of the rings shown in Figures 4 and 5 when the rings are in combined position, Figure 7 is a perspective view of a further modification showing the upper component ring particularly disclosing the under side thereof, Figure 8 is a perspective view of the lower component ring which is to cooperate with the ring shown in Figure 7 and illustrating particularly the upper side thereof, Figure 9 is a cross sectional view through the rings shown in Figures 7 and 8 when combined taken through the splits thereof, Figure 10 is a perspective view of a still further modification of the invention showing the upper ring and particularly the under side thereof, Figure 11 is a perspective view of a ring which is to cooperate with the ring shown in Figure 10 and illustrating particularly the upper surface construction thereof, Figure 12 is a cross sectional view through the rings shown in Figures 10 and 11 when in combined position taken through the splits thereof, Figure 13 is a perspective view of a still further modification showing the upper ring of the combination and illustrating particularly the lower side thereof, Figure 14 is a perspective view of the lower component ring which is to cooperate with the ring shown in Figure 13 and illustrating particularly the upper side thereof, Figure 15 is a cross sectional view of the rings shown in Figures 13 and 14 when in combined operative position taken through the splits thereof, Figure 16 is an additional modification and shows in perspective the upper component ring illustrating particularly the lower side, Figure 17 is a perspective view of the lower component ring which is to cooperate with the ring shown in Figure 16 and illustrating particularly the upper side thereof, Figure 18 is a cross sectional view of the rings shown in Figures 16 and 17 when in combined operative position taken through the splits thereof, Figure 19 is an additional modification illustrating the upper component ring and showing particularly the under side, Figure 20 is a perspective view of the lower component ring which is to cooperate with the ring shown in Figure 19 and illustrating particularly the upper side, Figure 21 is a cross sectional view of the rings shown in Figures 19 and 20 when in combined operative position taken through the splits thereof, Figure 22 is a plan view of one component part of a packing ring with passages for scraped off oil, Figure 23 is a cross sectional view of the ring shown in Figure 22, and—

Figure 24 is a plan view of a packing ring showing the eccentric flanges.

In the first modification which is shown in Figures 1, 2 and 3, the axially extending flange 2 in the top ring 3 is located at the inner edge of the ring on both sides of the split 4, while at the back of the ring the axially extending flange 5 is located at the outer edge of the ring. It will be noted that the flange changes over at 6 from one edge of the ring to its other edge. In order that two of such rings may be assembled it is necessary that the parts 6 be removed at least from one ring of the pair cooperating together. This has beeen done upon the bottom ring 7 shown in Figure 2 where the flange 8 located at the interior edge and the flange 9 located at the outside edge are discontinuous. Thereafter rings 1 and 2 may be placed together as shown in Figure 3.

It is necessary that the flanges 8 should not be made so long that insufficient clearance is obtained for their ends in the recess 10 located at the inside of flange 5. In other words, the length of the recess 10 between the part 6 must be greater than the total length of the flanges 8 plus the width of the split 1 when the ring is being pulled over its piston. Likewise the flanges 5 and 9 must not be longer than the sum of their lengths is smaller than the inner circumference of the cylinder for the piston. If the sum of their lengths is equal to the circumference the ends of the flanges 5 and 9 will abut.

The second modification shown in Figures 4, 5 and 6 is the same as the first modification above with the exception that both of the rings are constructed exactly alike and the flanges are not continuous in either of them. From a manufacturing viewpoint it is of course to be preferred that the component rings be substantially alike so that they may be substituted one for the other. The height $b$ of the bottom ring 7 at the slot 1 is equal to the height $d$ of the top ring 10 at the split 4 and nearly half of the height of the combination ring.

Pressure gases have a tendency to find their way from behind the ring through the split 1 and therefore the height $b$ may be diminished in order to prevent such escape. Such a modification has been shown in the third modification shown in Figures 7, 8 and 9.

However, in this modification the two rings comprising the combination are unequal. While the axial flanges of the bottom ring 11 have the same height and therefore the distance $a$ in Figure 9 equals the distance $g$, the height of the axial flanges of the top ring 12 are different so that the height $c$ at the back of the ring is greater than the height $k$ at the neighborhood of the split.

In order to construct the two rings so that they are equal and still at the same time keep the passage at the split 1 as small as possible, the distance $a$ is made equal to $c$, and this modification is shown in Figures 10, 11 and 12. At the same time it is not necessary to make $g$ greater than $f$ as has been done in the previous modification and $g$ is made equal to $f$. Due to the above changes, the rings become simpler in appearance and are also somewhat less expensive and simpler to make. It is of course obvious, that in the previous modification shown in Figures 7, 8 and 9, $g$ can be made equal to $f$.

In some cases it is possible to dispense with the radial flange of one of the combination rings as is shown in the modification illustrated in Figures 13, 14 and 15. Otherwise, this modification is mainly like that shown in Figures 7, 8 and 9. In the modification shown in Figures 13, 14 and 15 the top ring 11 comprises only the axial flanges 12 and 13 which will coact with the axial flanges 14 and 15 of the bottom ring 16. The flanges 12 and 13 could have an equal width so that $m$ would equal $n$. However, the distance $b$ should preferably be as small as possible in order to accomplish the purpose above mentioned and the distance $f$ should be as large as possible for a purpose to be described hereinafter.

In certain cases a piston ring must often be subjected to a certain amount of working in order to get the desired form and the desired outward pressure. This work is most intense at the back of the ring and decreases toward the end of the ring. If $f$ be constructed much smaller than $g$, then it may happen that the ring is too weak to undergo the above mentioned work. For that reason it is better to make $f$ larger than $g$. If however, it is desired to make $f$ smaller, these difficulties may be avoided by providing the axial flanges heretofore mentioned, namely 5, 9, 12, 15, 17, 18, 19, 20, 21 and 22, with slits down to the radial web.

The rings shown in the modifications above described may also be used for piston rod packings. As is well known all such rings have a tendency to spring inwardly or outwardly depending upon the particular purpose in each case. If however, used in stuffing boxes for piston rod packings, it is preferable to use the form shown in the modification illustrated in Figures 16, 17 and 18, in which the web 23 at the split 24 is located at the outer edge and the web 25 at the back of the ring is positioned at the inner edge of the ring.

Instead of or simultaneously with the use of a small width $b$ of the radial flange there may be used other means for closing the split than the particular butt joint shown, such for instance as a lap joint or the provision of an axial projection upon the axial flange 5 which will cover the split 1 from the outside.

The latter modification is shown in Figures 19, 20 and 21 wherein the upper ring 26 is provided with a projection 27 which cooperates with the recess 28 located in the lower ring 29 adjacent the split 30. In this case it will be noted particularly from Figure 21, that the projection 27 completely closes the split 30 when the two rings are in assembled position.

The curved surfaces of the rings which coact with one another may preferably be constructed so as to be mutually eccentric and as shown in Figure 24, which shows the same packing ring as illustrated in Figures 13-15 or a section through the packing ring illustrated in Figure 3 along a plane on top of the flanges 8 and 9 with the coacting surfaces between the flanges 13 and 15 and the flanges 14 and 16 mutually eccentric. Otherwise, the said surfaces might cause undue friction and oppose the proper "breathing" of the rings, namely the periodical expansion and contraction during the work in the cylinder.

It will be noticed that no extra steps are required in order to prevent these rings from mutual rotation because the ends of the axial webs serve as stops. Furthermore, the rings may be used as fire check rings with great advantage. They can also serve as oil scraper rings as shown in Figures 22 and 23 where only one component ring is shown, the other being exactly alike, for which purpose the axial flanges are perforated on both the component rings for instance by being cut away entirely in some places 31 and 32 spaced around the ring, thereby affording radial passages through the ring for the scraped off oil.

The term "working" heretofore used in this specification means that the piston packing rings work in the cylinder and the piston. The rings are lodged in grooves in the piston and follow the movements of the piston. During the operation of the engine the packing rings make a tight fit against the cylinder wall and expand against said wall. Naturally, the rings will thereby be exposed to shocks or blows tending to compress the rings in their grooves and the rings are alternately expanded and compressed because the wall surface is not always exactly even and also because the piston during its movement is urged from one side to the other side of the cylinder wall due to the reaction set up by the piston rod.

As the rings have split joints, these joints will obviously open and close more or less and this is termed "breathing." Therefore the rings "breathe" during the working of the combustion engine. The term "working" as used in this specification means "breathing."

I claim:—

1. A packing ring comprising two split rings, each ring being L-shaped in cross section with the splits displaced about 180° in relation to each other, one of said rings having an axially extending flange and the other of said rings having an axially extending flange coacting with said first mentioned flange, the axially extending flange of one component ring being disposed outside the coacting axially extending flange of the other component ring on about one-half of the circumference and inside upon the other half of said circumference, said other half comprising the ends of the ring at both sides of the split.

2. A packing ring comprising two complete interengaging split rings, one of the component rings being provided with axially extending flanges for engaging corresponding recesses in the cooperating ring, said flanges being disposed upon one edge of the ring upon both sides of the split and upon the other edge of the ring upon the portion of the ring that is opposite the split.

3. A packing ring comprising two coacting split rings, said rings being L-shaped in cross section, one of said rings having an axially extending flange for approximately one-half of its circumference disposed at the outside edge of the ring and the other half of the circumference of said ring having an axially extending flange located at the inside edge of the ring, said last named half of the ring having the ends of the ring therein and the curved coacting surfaces of said flanges being mutually eccentric.

TAGE MADSEN.